Jan. 19, 1971 E. C. S. TAYLOR 3,555,747
LIGHTWEIGHT CROSSARM ASSEMBLIES
Filed June 12, 1969 3 Sheets-Sheet 2
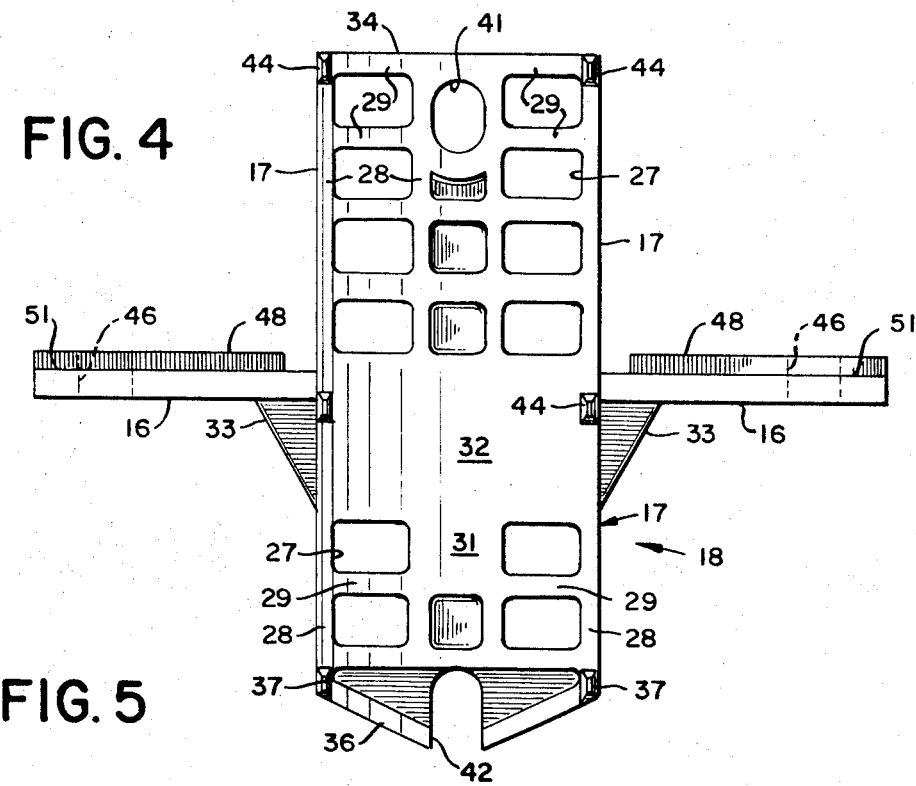
FIG. 4
FIG. 5
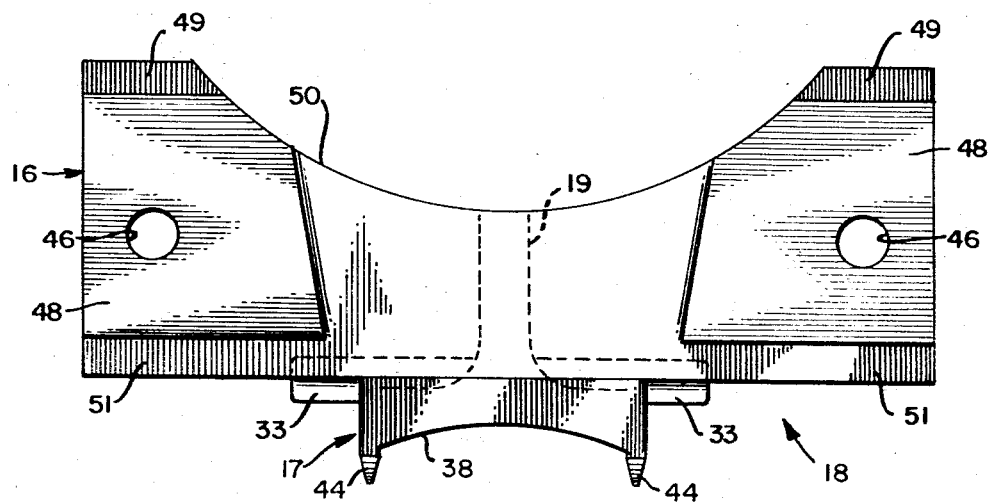
INVENTOR
EDWIN C. S. TAYLOR
BY
MATTERN WARE & DAVIS
ATTORNEYS Jan. 19, 1971     E. C. S. TAYLOR     3,555,747
LIGHTWEIGHT CROSSARM ASSEMBLIES
Filed June 12, 1969     3 Sheets-Sheet 3
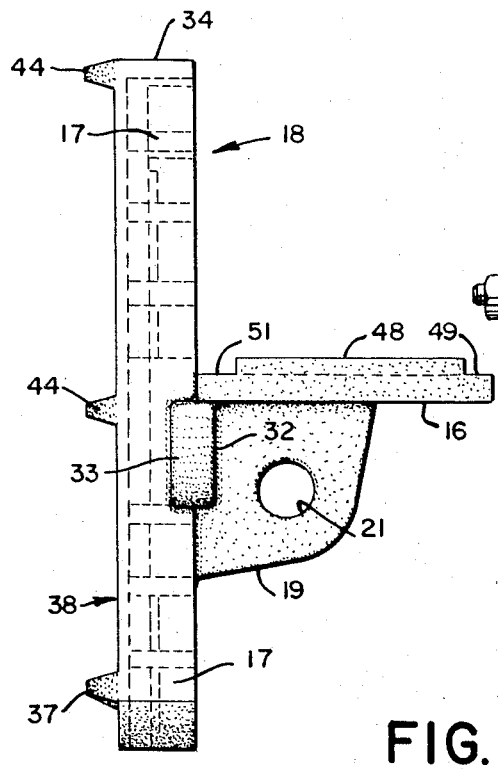
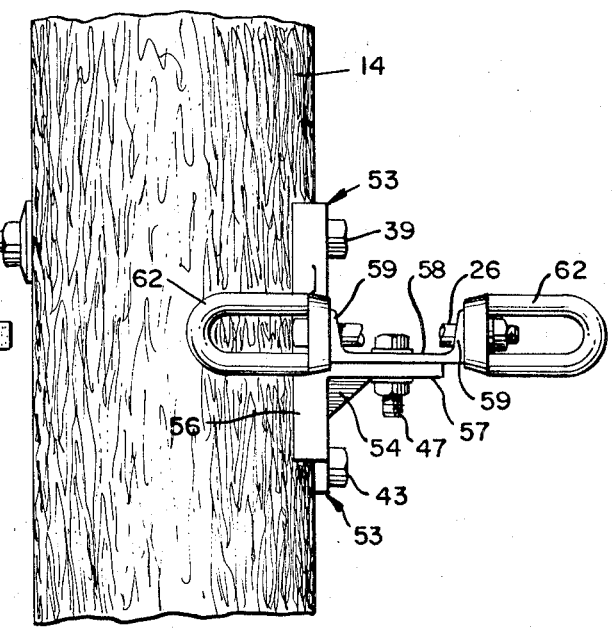
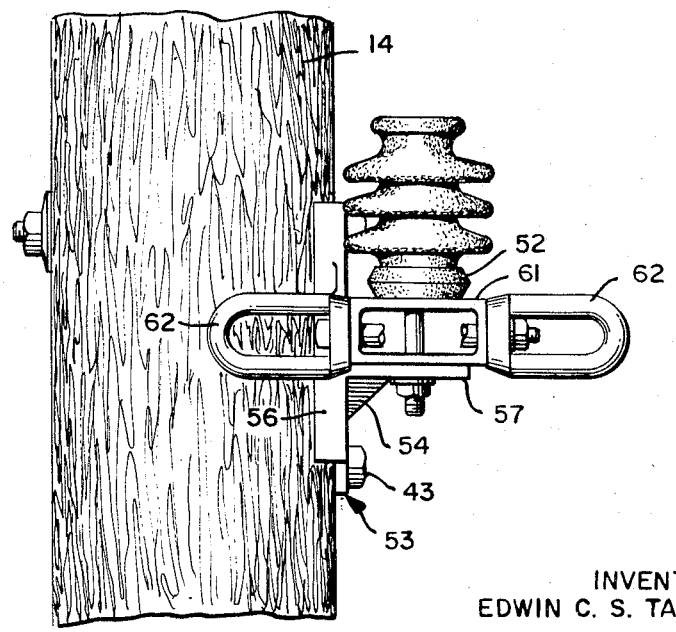
INVENTOR
EDWIN C. S. TAYLOR
BY
MATTERN WARE & DAVIS
ATTORNEY United States Patent Office 3,555,747
Patented Jan. 19, 1971

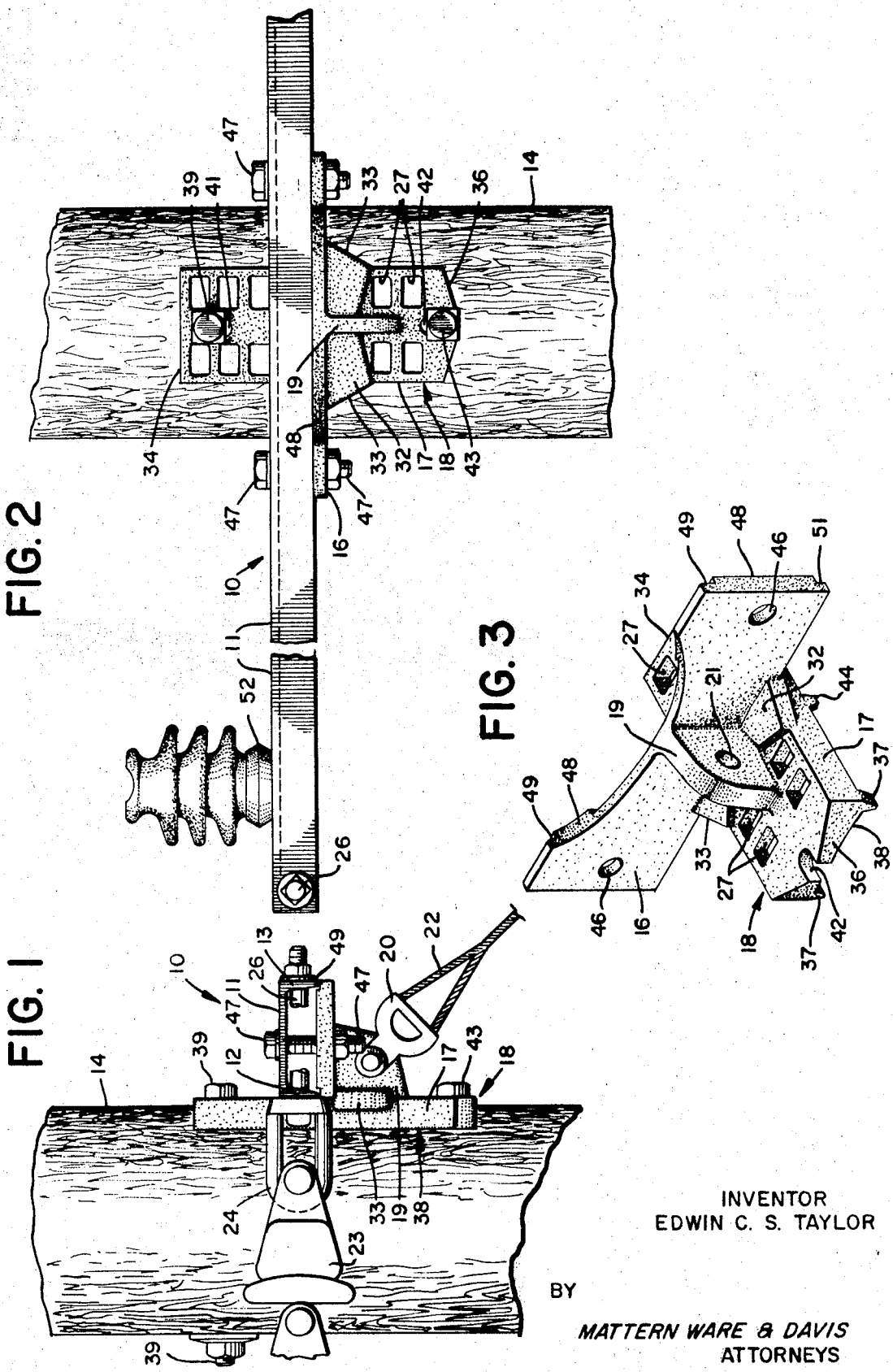

3,555,747
LIGHTWEIGHT CROSSARM ASSEMBLIES
Edwin C. S. Taylor, New Haven, Conn., assignor to MIF Industries, Inc., Branford, Conn.
Filed June 12, 1969, Ser. No. 832,725
Int. Cl. E04h 12/24
U.S. Cl. 52—40       9 Claims

ABSTRACT OF THE DISCLOSURE

Lightweight prefabricated modular utility pole crossarms, constructed from transversely-extending structural shapes combined with shelf-type pole gains, assembled at the factoy or at the site to form sturdy, rigid, unitary and esthetically pleasing crossarms for utility pole line construction.

This invention relates to utility pole crossarms to replace heavy timber crossarms on public utility pole line construction, and more particularly to lightweight crossarms formed of a structural shape such as a channel section beam anchored to a metal pole gain incorporating a protruding supporting shelf.

BACKGROUND OF THE INVENTION

Heavy timber crossarms bolted to utility poles have become familiar sights across the countryside for many years, and their installation alongside highways, streets and railroad rights-of-way has caused much criticism from those who would prefer to observe the landscape without viewing such obstructions. The sheer weight and bulk of timber crossarms have provoked objections from such sources, and utility linemen have also found conventional heavy timber crossarms to be extremely heavy and awkward, requiring block and tackle slings for hauling them from ground level to installation height near the top of the utility pole, and also requiring temporary rope slings supporting each crossarm during installation or change of position of such timber crossarms.

Lightweight insulator and accessory mounting brackets of different kinds formed of cast iron and lightweight plastic materials have been proposed, but the overall span and load carrying capacity of such brackets is limited by the design strength and bending moment limitation inherent in such products.

Accordingly, a significant need exists for sturdy lightweight crossarm units having a significantly reduced apparent cross-sectional area, while also providing the ability to carry the vertical loads imposed by long spans of heavy conductor cables and the concurrent ability to withstand longitudinal "deadend loads" produced by the full tension load in a terminating conductor cable and to transmit such longitudinal loads directly to a down guy connecting the "deadend" utility pole to a ground anchor.

Accordingly, a principal object of the present invention is to provide sturdy, lightweight, prefabricated crossarm units with high load carrying capabilities.

A further object of the invention is to provide such crossarm units which are capable of transmitting deadend loads directly to down guy ground anchors.

Another object of the invention is to provide such sturdy lightweight crossarm units incorporating standard rolled structural steel shapes as their principal transverse members.

Other and more specific objects will be apparent from the features, elements, combinations and operating procedures disclosed in the following detailed description and shown in the drawings.

THE DRAWINGS

FIG. 1 is a side elevation view of a crossarm assembly incorporating the features of the present invention;

FIG. 2 is a fragmentary front elevation view of the crossarm assembly shown in FIG. 1;

FIG. 3 is a bottom perspective view of the pole gain portion of the assembly shown in FIGS. 1 and 2;

FIG. 4 is an enlarged rear "pole-side" elevation view of the gain shown in FIG. 3;

FIG. 5 is an enlarged top plan view of the gain shown in FIG. 4;

FIG. 6 is an enlarged side elevation view of the gain shown in FIGS. 4 and 5;

FIG. 7 is a side elevation view of a modified crossarm assembly incorporating a different embodiment of the present invention; and FIG. 8 is a similar side elevation view of a further modified embodiment of the present invention.

SUMMARY OF THE INVENTION

In the crossarm assembly illustrated in FIGS. 1 and 2, a rolled, channel-section structural steel member 10 forms the principal transverse crossarm member of the assembly there illustrated. The channel 10 is illustrated with its web 11 forming the topmost portion of this transverse crossarm, and the two terminal flanges 12 and 13 of member 10 are shown extending downward respectively along the edge of web 11 closest to the utility pole 14, and along the opposite edge of the web 11 spaced away from the utility pole 14. The lowermost edges of the two flanges 12 and 13 are seated upon a shelf 16 protruding horizontally from the pole engaging base 17 of a metal pole gain generally indicated at 18 in the drawings.

METAL SHELF GAIN

The shelf 16 protrudes in a direction away from the adjacent face of pole 14 as an integral portion of a unitary gain, preferably a metal casting of the kind illustrated in the perspective view of FIG. 3. In this figure it will be seen that the shelf 16 and the base 17 of the gain generally indicated at 18 are formed together in a one-piece casting as a single, unitary supporting member preferably rigidified by a structural rib 19 extending downward from the underside of the shelf 16 to merge with the outwardly facing surface of the base 17 in smoothly filleted junctures, avoiding stress concentrations and providing a sturdy, rigid structure for the gain 18.

In the preferred embodiment of the invention illustrated in FIGS. 1–6, the gain 18 is provided with means forming a down guy aperture 21 (FIGS. 3 and 6) extending laterally from side to side through the strengthening rib 19. By this means a down guy attachment such as the thimble clevis 20 may be anchored to the assembly by a pin extending through the down guy aperture 21, as shown in FIG. 1. The crossarm assembly 10–18 receives the full catenary tensile load of a dead-ended conductor cable through dead-end insulators 23, which are anchored by a thimble eyenut or a thimble eyelet 24 with a nut, lockwasher and bolt 26 passing horizontally through the outermost ends of the vertical flanges of the transversely extending channel crossarm 10. By this means the terminal tension load of a deadend conductor cable terminating at the pole 14 is transmitted through the transverse crossarm 10 and the gain 18 forming the assembled crossarm unit via the rib 19 to the downguy 22, thus utilizing a single pole attachment assembly for the transmission of the entire tensile load from the deadend conductor through the down guy to a suitable ground anchor, as indicated in FIG. 1.

The shelf gain 18 is provided with several structural features assuring its sturdy rigidity while minimizing its weight. For example, the weight of the gain 18 may be reduced as indicated in FIGS. 2, 3 and 4 by the incorporation of numerous through apertures 27 bounded by the vertical and horizontal web members 28 and 29 indicated in FIG. 4. The web members 28 and 29 form a gridiron structure having maximum stiffness and rigidity, with its weight being minimized by the through apertures 27, giving rise to the name "grid gain" for this class of metal pole gains.

As indicated in the rear elevation view of FIG. 4, a portion of the pole-engaging base 17 of gain 18 underlying the rib 19 forms a solid unitary central trunk portion 31 having no apertures 27 therethrough and the trunk portion 31 is formed integral with a generally horizontal central boss portion 32 lying behind the shelf 16 and integrally blending into rib 19 and the trunk portion 31. The boss portion 32, as indicated in FIGS. 3 and 4, may be furter strengthened by having a greater horizontal thickness, and may be blended with lateral ribs 33 extending outwardly from the sides of the base 17 diagonally upward toward the underside of the shelf 16. By this means, the central portion 31–32–33 of the gain 18 is provided with sturdy rigidity, while the topmost and bottommost portions of the gain are provided with the weight reducing apertures 27, permitting the outermost web members to carry the overturning moment produced by operating loads, bringing these loads to bear against the pole at points spaced upwardly and downwardly along the face of pole 14 substantially removed from the transverse crossarm 10. By this means the overturning moment produced by the dead weight of the crossarm 10 and its vertical load applied along a line of action parallel to and spaced outwardly away from the pole surface is sturdily resisted by the widespread upper and lower ends 34 and 36 of the gain base 17; the lower end 36 is forced by the overturning moment into even closer embedding contact with the face of pole 14, and this contact is further enhanced by the action of pole engaging spurs or teeth 37 protruding poleward from the outermost corners of the pole engaging face 38 of the gain base 17 at its lower end 36, as shown in FIGS. 3 and 4.

The overturning moment is further resisted by a throughbolt 39 passing through a throughbolt receiving aperture 41 formed in the upper end of gain base 17 and extending through a horizontal hole passing transversely through pole 14, to anchor the entire crossarm and gain assembly firmly upon the pole. An openended throughbolt receiving slot 42 is preferably formed opening downwardly at the center of the lower edge 36 of gain base 17, as shown in FIGS. 2, 3 and 4, to receive a spike, a drive screw, or a second throughbolt 43 as shown in FIG. 2, anchoring the lower end of gain 18 against sidewise movement and thus securing the assembly with transverse crossarm 10 oriented in a generally horizontal position, perpendicular to the axis of pole 14.

Additional teeth or spurs 44 extend forward from the pole engaging face 38 of the gain base 17 at the central and uppermost side edges thereof, as shown in FIGS. 3, 4 and 5, further enhancing the anchored engagement of the gain 18 with the face of pole 14 and resisting down-slotting movement of the assembly parallel to the pole face.

COOPERATING POSITIONING MEANS

In the preferred embodiment of the assembly illustrated in FIGS. 1–4, the standard channel section rolled steel beam member 10 is positioned with its flanges 12 and 13 extending downwardly and engaging the upper side of the gain shelf 16. This upper surface of shelf 16 is preferably provided with positioning means securing the crossarm member 10 in operative position thereon, including anchoring apertures 46 passing vertically through shelf 16 near the outer ends thereof as illustrated in FIGS. 4 and 5, and align with corresponding apertures formed passing vertically through the horizontal web portoin 11 of the transverse channel crossarm 10 for aligned engagement of anchor bolt and nut assemblies 47, in the manner shown in FIGS. 1 and 2. In addition, the positioning means incorporated in shelf 16 for positioning the transverse crossarm 10 in its preferred position thereon include lands 48 extending upward from the central lateral end portions of shelf 16 to form raised bosses thereon which are set back from the outwardly facing edge of shelf 16 and also from the poleward edge of shelf 16 to form flange receiving recesses 49 and 51. The poleward flange receiving recess 51 thus comprises a continuous flat portion of the edge of shelf 16 extending laterally from side to side directly in front of the front face of gain base 17, as shown in FIG. 5, and the outer flange receiving recess 49 comprises corresponding aligned flat portions positioned along the outermost edge of shelf 16 remote from the pole engaging gain base 17 at each side of a concavely curved weight-reducing cutout 50 intermediate the ends of the outermost edge of the shelf 16.

As indicated in FIG. 5, the laterally extending flange receiving recesses 49 and 51 are bounded on their outer edges by the terminal edge of the shelf 16, and on their inner sides by the upstanding bosses 48. As indicated in FIG. 1, the cooperating recesses 49 and 51 flanking the bosses 48 thus form a grooved "track" accommodating the terminal edges of flanges 12 of the channel section transverse crossarm 10, allowing the crossarm to be moved slidingly into position toward pole 14, with its innermost flange 12 being pushed poleward across boss 48 until it drops off the pole side of boss 48 into the poleward flange receiving recess 51 and seats itself against the outwardly facing surface of gain base 17, after which the channel section transverse crossarm 10 may be moved from side to side along the "track" formed by recesses 49 and 51 until its anchoring apertures are aligned with apertures 46 in shelf 16, permitting the anchor bolts 47 to be installed conveniently.

The combination of lands 48 and recesses 49 and 51 thus facilitates quick and convenient assembly of the lightweight transverse crossarm structures of the present invention either at the site, at the base of the pole, or by the lineman at the top of the pole, or at the factory or a hardware storage depot if desired.

STABLE INSULATOR SUPPORT

A principal advantage of the assembled crossarm unit illustrated in FIGS. 1–6, in which the standard channel-shaped rolled steel section serves as the transverse crossarm portion, is the unobstructed flat upper surface of the transverse crossarm 10 provided by the "back" face of the web portion of the channel section crossarm 10. As shown in FIG. 1, this unobstructed, upward-facing flat surface is preferably about four inches in longitudinal width, measured in the direction of the pole line across the crossarm 10. The wide, flat, upward-facing top surface provides a stable support area for the flat underside of the base of a post or pin-type insulator, and particularly for the wide, flat base of such 15 kv. to 45 kv. insulator line posts as that shown at 52 in FIG. 2, whose base measures four inches or more in diameter.

The versatility of the lightweight crossarm assemblies shown in FIGS. 1–6 thus provides capability for deadending of conductors secured by such means as the deadended insulator 23 and a thimble eyenut or eyelet 24 shown in FIG. 1, coupled with concurrent capability for supporting post-type or pin-type insulators such as the insulator 52 seated and anchored with rigid stability on the unobstructed flat upper surface of the transverse crossarm 10, as shown in FIG. 2.

POLE LINE ASSEMBLIES WITHOUT DEADEND CAPABILITY

Since the majority of transverse crossarms for utility pole line construction are employed along the length of the pole line and not at a deadend pole, economies of manufacture saving weight, cost and installation time can be achieved by the modified embodiments of the invention illustrated in FIGS. 7 and 8. In these embodiments, a lighter weight shelf gain 53 having a minimum size supporting rib 54 joining the central lower portion of the vertical gain base 56 to a horizontal shelf 57 provides ample support for the gain shelf 57 when the added stress of the down guy 22 is not to be imposed upon any integral part of the crossarm assembly. If the upper surface of shelf 57 of the gain 53 is flat, it can accommodate a channel section crossarm such as the channel 58 having its flanges 59 facing upward, with its flat back web surface facing downward in engagement with the smooth upper face of shelf 57, as shown in FIG. 7.

In the further modified embodiment shown in FIG. 8 a tubular section crossarm 61 of welded steel or of molded or extruded plastic or other suitable material, is shown mounted on a similar smooth upper surface of the shelf 57 of the lightweight gain 53. Tubular crossarm 61 can also be mounted on shelf 16 of shelf gain 18 if desired. This rectangular section transverse crossarm 61 provides an unobstructed smooth flat upper surface for mounting of wide-base insulators such as the insulator 52 shown in FIG. 2. Where the mounting of such insulators is not required, the upward facing flanges of the channel 58 shown in the embodiment of FIG. 7 may be suitable for back to back deadening of conductors secured by such means as the thimble eyenuts or eyelets 62 connected by a horizontal throughbolt passing through the flanges 59 of the channel 58 in that embodiment.

The unusual strength, light weight, low cost and high convenience of the crossarm assemblies of the present invention satisfy many requirements of pole line construction, providing a rigid sturdy crossarm structure having an attractively small cross sectional area exposed to view, providing ample structural rigidity for supporting deadended conductors and heavy through conductors on pin-type or post-type insulators mounted on the ends of the transverse crossarm portion, and providing downguy connection capabilities if required. The unusually light weight of these assemblies facilitates their handling, storage and installation, with great convenience for construction and repair personnel, eliminating the need for block and tackle slings and other appliances to carry the weight of heavy, awkward timber crossarms.

Since the foregoing description and drawings are merely illustrative, the scope of the invention has been broadly stated herein and it should be liberally interpreted so as to obtain the benefit of all equivalents to which the invention is fairly entitled.

What is claimed is:

1. A lightweight utility pole crossarm assembly comprising:
   (A) a self gain incorporating a vertically elongated base portion having a pole engaging face and an opposite exposed face, a platform-like shelf protruding outwardly from the exposed face in a direction substantially perpendicular to the axis of the utility pole upon which the shelf gain is to be mounted, and stiffening rib means extending from the base portion to the shelf portion in stress transmitting relationship.
   (B) transversely extending crossarm means, including a transverse horizontal web portion and vertical side wall means, protruding laterally beyond the utility pole and resting upon the shelf of the shelf gain, and
   (C) anchoring means centrally securing the transversely extending crossarm means in fixed supported relationship upon the shelf of the shelf gain.

2. The utility pole crossarm assembly defined in claim 1 wherein the stiffening rib means includes a pair of lateral reinforcing ribs extending diagonally upward from the side edge of the base portion to join the underside of the shelf portion.

3. The utility pole crossarm assembly defined in claim 1 wherein the strengthening rib means includes a central rib protruding from the exposed face of the base portion and extending upwardly to joint the underside of the shelf portion.

4. The utility pole crossarm assembly defined in claim 3 wherein the central rib includes downguy aperture means for connecting a downguy attachment to the shelf gain portion of the lightweight crossarm assembly.

5. The utility pole crossarm assembly defined in claim 1 wherein the transverse crossarm portion comprises a channel section structural shape.

6. The utility pole crossarm assembly defined in claim 1 wherein the transverse crossarm portion comprises a tubular member having a flat exposed upper surface.

7. The utility pole crossarm assembly defined in claim 1 wherein the anchoring means comprises anchor bolts passing through aligned apertures in the transverse crossarm portion and the shelf portion of the pole gain.

8. The utility pole crossarm assembly defined in claim 1 wherein the transverse crossarm portion comprises a rolled structural member channel shaped in cross section and having its flanges extending downwardly from an uppermost central web portion to engage the marginal edge portion of the shelf portion of the pole gain respectively adjacent to and remote from the nearest surface of the utility pole.

9. The utility pole crossarm assembly defined in claim 8 wherein the shelf portion of the shelf gain includes transverse recesses positioned to receive and support the edges of the terminal flanges of the channel section crossarm portion, and wherein the transverse recesses flank an upwardly protruding boss formed on the upper surface of the shelf serving to stiffen the shelf and to provide transverse edges delineating the boundaries of the transverse recesses and forming transverse track means for guiding the lateral positioning of the transverse crossarm flange edges thereon.

References Cited

UNITED STATES PATENTS

| 868,591 | 10/1907 | Yaxley | 52—697 |
| 1,815,598 | 7/1931 | Stroup | 52—697X |
| 2,046,152 | 6/1936 | Dean | 52—721X |
| 2,175,778 | 10/1939 | Mackinnon | 52—721X |
| 2,969,859 | 1/1961 | Huggins | 248—221X |
| 3,342,925 | 9/1967 | Lewis et al. | 52—697X |

PRICE C. FAW, JR. Primary Examiner

U.S. Cl. X.R.

52—148, 697; 174—45; 248—221